(12) United States Patent
Khello et al.

(10) Patent No.: US 7,027,582 B2
(45) Date of Patent: Apr. 11, 2006

(54) METHOD AND APPARATUS FOR RESOLVING AN ENTITY IDENTIFIER INTO AN INTERNET ADDRESS USING A DOMAIN NAME SYSTEM (DNS) SERVER AND AN ENTITY IDENTIFIER PORTABILITY DATABASE

(75) Inventors: Robert Khello, Norsborg (SE); Miguel Cobo, Stockholm (SE); Victor Ferraro-Esparza, Madrid (ES); Antun Samukic, Pozuelo de Alarcon - Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 970 days.

(21) Appl. No.: 09/899,551

(22) Filed: Jul. 6, 2001

(65) Prior Publication Data
US 2003/0007482 A1    Jan. 9, 2003

(51) Int. Cl.
*H04L 12/56* (2006.01)
*H04L 12/66* (2006.01)
*H04M 3/42* (2006.01)
*H04M 7/00* (2006.01)
*H04Q 7/20* (2006.01)

(52) U.S. Cl. ............ 379/220.01; 370/259; 370/354; 370/389; 379/201.01; 379/221.13; 379/900; 455/433; 455/445; 709/245

(58) Field of Classification Search ............ 370/259, 370/352, 353, 354, 355, 356, 357, 389, 401, 370/475; 379/201.01, 220.01, 221.01, 221.13, 379/900; 455/433, 443, 445; 709/245, 219, 709/220, 228; 707/10
See application file for complete search history.

(56) References Cited

U.S. PATENT DOCUMENTS

| | | | |
|---|---|---|---|
| 5,974,453 A | 10/1999 | Andersen et al. | 709/220 |
| 6,002,759 A | 12/1999 | Kallioniemi et al. | 379/220.01 |
| 6,021,126 A | 2/2000 | White et al. | 370/352 |
| 6,064,887 A | 5/2000 | Kallioniemi et al. | 455/445 |
| 6,131,095 A * | 10/2000 | Low et al. | 707/10 |
| 6,201,965 B1 | 3/2001 | Mizell et al. | 455/433 |

OTHER PUBLICATIONS

Individual Submission, Internet Draft, A. Gallant, NeuStar, Inc. Nov. 24, 2000, search.ietf.org/internet-drafts/draft-gallant-enum-ifax-01.txt, printed Jun. 14, 2001, "ENUM, E.164, and Internet Fax".

Network Working Group, Request for Comments: 2915, M. Mealling, Network Solutions, Inc., and R. Daniel, DATAFUSION, Inc., Sep. 2000, ietf.org.rfc/rfc2915.txt?number=2915, printed Jun. 14, 2001, "The Naming Authority Pointere (NAPTR) DNS Resource Record".

(Continued)

*Primary Examiner*—Harry S. Hong
(74) *Attorney, Agent, or Firm*—Nixon & Vanderhye P.C.

(57) ABSTRACT

The present invention provides an efficient way of resolving telephone numbers and other entity/device identifiers into Internet addresses as well as accommodating portability of those telephone numbers and other entity/device identifiers without having to substantially modify or rework the domain naming system (DNS) infrastructure or established number portability schemes. Self-contained, additional functionality is implemented on a DNS server which allows smooth IP address resolution of telephone numbers or other entity/device identifiers by taking advantage of existing portability databases without impacting the existing networks that create and maintain such portability databases.

68 Claims, 7 Drawing Sheets

OTHER PUBLICATIONS

Network Working Group, Request for Comments: 2916, P. Falstrom, Cisco Systems Inc., Sep. 2000, www.ietf.org/rfc/rfc2916.txt?number=2916, "E.164 number and DNS".

Network Working Group, Request for Comments: 1034, P. Mockapetris, ISI, Nov. 1987, ieft.org/rfc/rfc1034.txt?number=1034, "Domain Names—Concepts and Facilities".

Network Working Group, Request for Comments: 1035, P. Mockapetris, ISI, Nov. 1987, ietf.org/rfc/rfc1035.txt?number=1035, "Domain Names—Implementation and Specification".

*ONLINE!*, Mar. 2001, pp. 1-33, XP002192483, Retrieved from the Internet: URL:search.ietf.org/internet-drafts/draft-ietf-enum-e164-gstn-np-03.txt>, retrieved on Mar. 8, 2002, M. Foster et al., "Number Portability in the GSTN: An Overview" Internet Draft.

*ONLINE!*, Sep. 2000, pp. 1-7, XP002192484, Retrieved from the Internet: URL:www.faqs.org/rfcs/rfc2916.html, retrieved on Mar. 8, 2002, P. Falstrom, "E.164 number and DNS" Request for Comments: 2916.

M. Foster et al: "Number Portability in the GSTN: An Overview" 12 pages, Internet Draft, Mar. 2001, XP002192483.

P. Falstrom: "E.164 Number and DNS" 4 pages, Internet Draft, Sep. 2000, XP002192484.

*Technical Specification* 3GPP TS 23.140 v5.1.0 (Dec. 2001), 3$^{rd}$ Generation Partnership Project; Technical Specification Group Terminals; Multimedia Messaging Service (MMS); Functional description; Stage 2 (Release 5).

Network Working Group, Request for Comments: 2915; Updates: 2168, Category: Standards Track, M. Mealling et al., Sep. 2000, "The Naming Authority Pointer (NAPTR) DNS Resource Record".

*Technical Specification*, 3GPP TS 23.228 v5.3.0 (Jan. 2002), 3$^{rd}$ Generation Partnership Project; Technical Specification Group Services and System Aspects; I'P Multimedia Subsystem (IMS); Stage 2 (Release 5).

*Technical Specification*, 3GPP TS 23.066 v4.0.0 (Mar. 2001), 3$^{rd}$ Generation Partnership Project; Technical Specification Group Core Network; Support of Mobile Number Portability (MNP); Technical realization; Stage 2; (Release 4).

U.S. Appl. No. 09/984,265, filed Oct. 29, 2001.

* cited by examiner

METHOD AND APPARATUS FOR RESOLVING AN ENTITY IDENTIFIER INTO AN INTERNET ADDRESS USING A DOMAIN NAME SYSTEM (DNS) SERVER AND AN ENTITY IDENTIFIER PORTABILITY DATABASE

FIELD OF THE INVENTION

The present invention relates to providing Internet-based, conversational types of applications, e.g., a voice-over-IP application, and multimedia types of applications, e.g., streaming and multimedia message services, without the user having to know specific Internet addresses of remote devices or other entities with which a user may want to communicate using these types of applications.

BACKGROUND AND SUMMARY OF THE INVENTION

The present invention draws upon two different areas of communication: data packet-based communication employing Internet addresses and circuit-based communication where telephone (or other identifier) number portability has evolved to enable a subscriber to "port" a subscriber telephone number or other communication identifier geographically and/or between service providers. Packet-based communications are addressed first.

When computers attached to a network communicate, Internet protocol (IP) addresses are used to identify those computers and typically correspond to 32 bit integers for IP version 4 or 128 bit integers IP version 6. Although such IP addresses provide a convenient, compact representation for specifying the source and destination for packets sent across an Internet, human users prefer to assign computers pronounceable, easily remembered names. As a result, the domain naming system (DNS) was developed to provide a scheme for assigning meaningful, high level names to a large set of computers, and to provide a mechanism that maps between high level computer names and IP addresses.

In general, the domain naming system can be viewed as a distributed, shared database of domain names and corresponding IP addresses. Domain servers, more commonly called DNS servers, maintain these databases. An example of a common DNS server is a UNIX-type machine running a version of Berkeley Internet Naming Software (BIND). A domain name may consist of a sequence of subnames separated by a delimiter character—the period. Individual sections of the name might represent sites or groups, but the domain naming system simply refers to each section of a name as a label. An example of such a domain name is an Internet address such as http://www.ericsson.se or an e-mail address such as name@ericsson.com. The label after the period is the site name authorized by a central authority. The label(s) before the period is(are) the part of the name controlled by the specific site. Here, the top level Internet domain corresponding to the site is the country code "se" for Sweden, and for e-mail address, it is the top level domain "com".

Domain servers are conceptually arranged in a tree structure that corresponds to a naming hierarchy. The root of the tree is a server that recognizes the top level domains (or tiers) and knows which server resolves each domain. Given a name to resolve, the root can choose the correct server for that name. At the next level or tier, a set of name servers each provide resolution answers for one top level domain, e.g., se. A server at this domain knows which servers can resolve each of the subdomains under its domain. At the third level of the tree, name servers provide answers for subdomains, e.g., ericsson under se. The conceptual tree continues with one server at each level for which a subdomain has been defined.

Links in the conceptual tree, however, do not indicate physical network connections. Instead, they point to other name servers. Conceptually, domain name resolution proceeds top down, starting with the "root" name server and proceeding to servers located at the branches or leaves of the tree. There are two ways to use the domain naming system: (1) by contacting name servers one at a time, or (2) asking a name server system to perform the complete translation. In either case, client software forms a domain name query that contains the name to be resolved, a declaration of the class of the name, the type of answer desired, and a code that specifies whether the name server should translate the name completely. It sends the query to a DNS server for resolution.

When a DNS server receives a query, it checks to see if the name lies in the subdomain for which it is an authority. If so, it translates the name to an address according to its database and appends an answer to the query before sending it back to the client. If the DNS server cannot resolve the name completely, it checks to see what type of interaction the client specified. If the client requested complete translation, (i.e., recursive resolution), the server contacts a DNS server that can resolve the name and returns the answer to the client. If the client requested non-recursive resolution, (i.e., iterative resolution), the name server cannot supply an answer. Instead, it generates a reply that specifies the name server the client should contact next to resolve the name. The dynamic host configuration protocol (DHCP) provides automated procedures by which a master node can assign an IP address to a server in the Internet, e.g., a DNS server. In general, IP addresses can be allocated to an entity either statically, i.e., a fixed IP address, or dynamically, i.e., only for as long as the entity is actively connected to the Internet. User devices, like a computer entity or a mobile device in a global packet radio system (GPRS) system, are normally assigned temporary Internet addresses. Although conceptually fairly simple, in practice, the resolution of IP addresses using DNS can be complex and time consuming.

The Internet and the domain naming system are designed to carry packet traffic for enabling computers to communicate. Other types of networks are designed to carry circuit-switched traffic. An example of a circuit-switched network is a legacy network, which employs the well-established Signaling System No. 7 (SS-7) as defined by various standards bodies. The routing of a telephone call through a legacy network employs a structured telephone numbering plan. Such structured rules are defined by the International Telecommunication Union (ITU) in the E-series Recommendation E.164. The E.164 numbering is applicable in all domains of telecommunications systems including wireline and wireless systems. Each physical node, referred to as a local exchange, is allocated one or more unique exchange number groups. The telephone number of a subscriber typically includes both an exchange number group (typically allocated in ten thousand number blocks) for the exchange to which a subscriber is connected, and a number in that group which is specific to the subscriber.

For example, a subscriber having a telephone number 881–1657 is connected to a local exchange having an exchange number group 881, within that group, the subscriber has a subscriber number of 1657. Thus, the telephone number is geographical in the sense that there is a defined relationship between the telephone number and a geographical area served by the exchange to which the subscriber is connected. There are also non-geographical telephone numbers where no geographical relationship exists. For example, toll free numbers, virtual private network numbers, and universal access numbers are typically serviced by intelligent networks (IN). IN services are controlled and executed by a service control point (SCP) using data stored in a service data function (SDF).

When a subscriber physically re-locates or changes service providers, it is desirable for the subscriber not to have to change his telephone number. Accordingly, number portability services permit a subscriber to "port" or transfer his telephone number to wherever the subscriber physically relocates or to a different service provider. Similarly, a mobile subscriber E.164 identification number, such as the MSISDN, is used to identify the mobile subscriber, the subscriber's subscription, and the subscriber's current location. When a mobile subscriber changes service providers, a mobile subscriber number portability database is updated to reflect the change. Commonly-assigned U.S. Pat. No. 6,064,887 describes an example of mobile subscriber number portability in a telecommunications network that permits a mobile subscriber to retain its same MS ISDN when changing service providers.

Recently, there have been discussions in the Internet Engineering Task Force (IETF) and other forums of the possibility of permitting a user to enter a telephony number, hereafter often referred to as an "E.164 number," into a computing device with the goal of treating that E.164 number as a DNS query for which a corresponding Internet address is supplied by the DNS. This particular type of DNS query is referred to as an ENUM query. A recent IETF request for comments (RFC) 2916 entitled, "E.164 Number and DNS," outlines the possible use of the domain naming system for the storage of E.164 telephony numbers. The DNS is used to identify available services connected to an E.164 number.

While this idea is quite desirable in theory, there are a number of problems before it becomes practical. In particular, deploying an E.164 number-to-IP address mapping within the DNS infrastructure is quite cumbersome. For example, in order to accommodate portability of the E.164 number within the domain naming system for both different geographical locations and different service providers, it would be necessary to update the E.164 and IP-address relationship in the DNS databases whenever a portability process is executed for a specific user. In addition, it would be necessary to upgrade the DNS infrastructure with many more DNS servers to handle the millions/billions of numbers that exist in the telecommunications world. There must be coordination of the user location or subscription information between the DNS and telecommunication systems. Service provider's management systems would need to be updated to attach the DNS/DHCP management routines to the same management routines used to handle the portability service of the E.164 numbering scheme. Furthermore, the very openness and flexibility of the Internet in allocating temporary IP-addresses to user devices potentially undermines the integrity of simple, one-to-one mapping tables between E.164 telephone numbers and IP-addresses. Sophisticated protection against hackers modifying the stored E.164 numbering resources would be needed. If tampering resulted in an inability to communicate with that E.164 number, the consequences could be very serious including lost income, decreased customer satisfaction, and increased user complaints.

The present invention provides a much simpler and secure way of permitting resolution of traditional telephone numbers and other entity/device identifiers into Internet addresses. It further accommodates portability of telephone numbers and other entity/device identifiers without having to substantially modify or rework the DNS infrastructure or various established number portability schemes. Self-contained, additional functionality is readily implemented on a DNS server to allow smooth IP address resolution of telephone numbers or other entity/device identifiers by taking advantage of existing portability databases without impacting the existing networks that create and maintain such portability databases.

In general, the present invention permits resolution of a telephone number or other identifier of an entity to be contacted into an Internet address, i.e., an IP address, using a domain name system and a portability database. The term "entity" encompasses devices as well as subscribers, users, etc. Portability database is often used in the context of a telephone number portability database. However, the invention is not limited thereto and encompasses any type of portability database. The telephone number or other identifier to be resolved is provided to a server which includes functionality for accessing a portability database. For the telephone number example, a telephone number portability database may be a mobile network number portability database, a fixed network number portability database, and/or an intelligent network number portability database.

From the access of the number portability database, the server determines, among other things, the identity of the network operator currently serving the entity/device to be contacted. In particular, the number portability database provides a network identifier corresponding to the network operator associated with the entity. The network identifier is used to make the process of resolving the telephone number into a corresponding Internet address faster and more efficient by sending the query directly to a DNS server in the identified network for resolution.

In a non-limiting, example embodiment, a DNS server that receives the request to resolve an E.164 telephone number into an IP address includes a DNS resolution processor for handling Internet address resolution requests as well as a resolution extension handler. The resolution extension handler consults a telephone number portability database using the telephone number and obtains therefrom the network identifier corresponding to the network operator currently associated with the entity. The DNS resolution processor uses that network identifier in the process of resolving the telephone number into the corresponding Internet address. The resolution extension handler is configured to use or emulate a protocol associated with the number portability database when it makes its consultation. As a result, the DNS server uses existing number portability databases rather than having to create DNS number portability databases for a myriad of telephone numbers or other entity addresses.

Further example implementation details in this non-limiting embodiment include the DNS resolution request for an input E.164 telephone number being constructed as an ENUM query. The DNS resolution processor includes the network identifier returned from the number portability database in the ENUM query and sends the query on to a second DNS server corresponding to the network identifier. The DNS resolution processor receives from the second DNS a naming authority pointer (NAPTR) record with one or more resource records containing uniform resource identifiers (URIs) corresponding either to the actual telephone number, (e.g., an e-mail address), or to the network boundary servers where the E.164 subscription resides, (e.g., the address of a proxy server, a gateway switching center, or a multimedia messaging service center used for the delivery of messages to users). In other words, the NAPTR record includes available ways of contacting a specific node identified by the domain name, including E.164 telephone numbers. Specifically, the NAPTR record includes an Internet address associated with the telephone number.

BRIEF DESCRIPTION OF THE DRAWINGS

The foregoing and other objects, features, and advantages of the invention will be apparent from the following description of preferred, non-limiting example embodiments, as well as illustrated in the accompanying drawings. The drawings are not to scale, emphasis instead being placed upon illustrating the principles of the invention.

DETAILED DESCRIPTION

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. In some instances, detailed descriptions of well-known methods, protocols, software and hardware platforms, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuitry, using software functioning in conjunction with a suitably programmed digital microprocessor or general purpose computer, using an Application Specific Integrated Circuit (ASIC), and/or using one or more Digital Signal Processors (DSPs).

Figure 1:
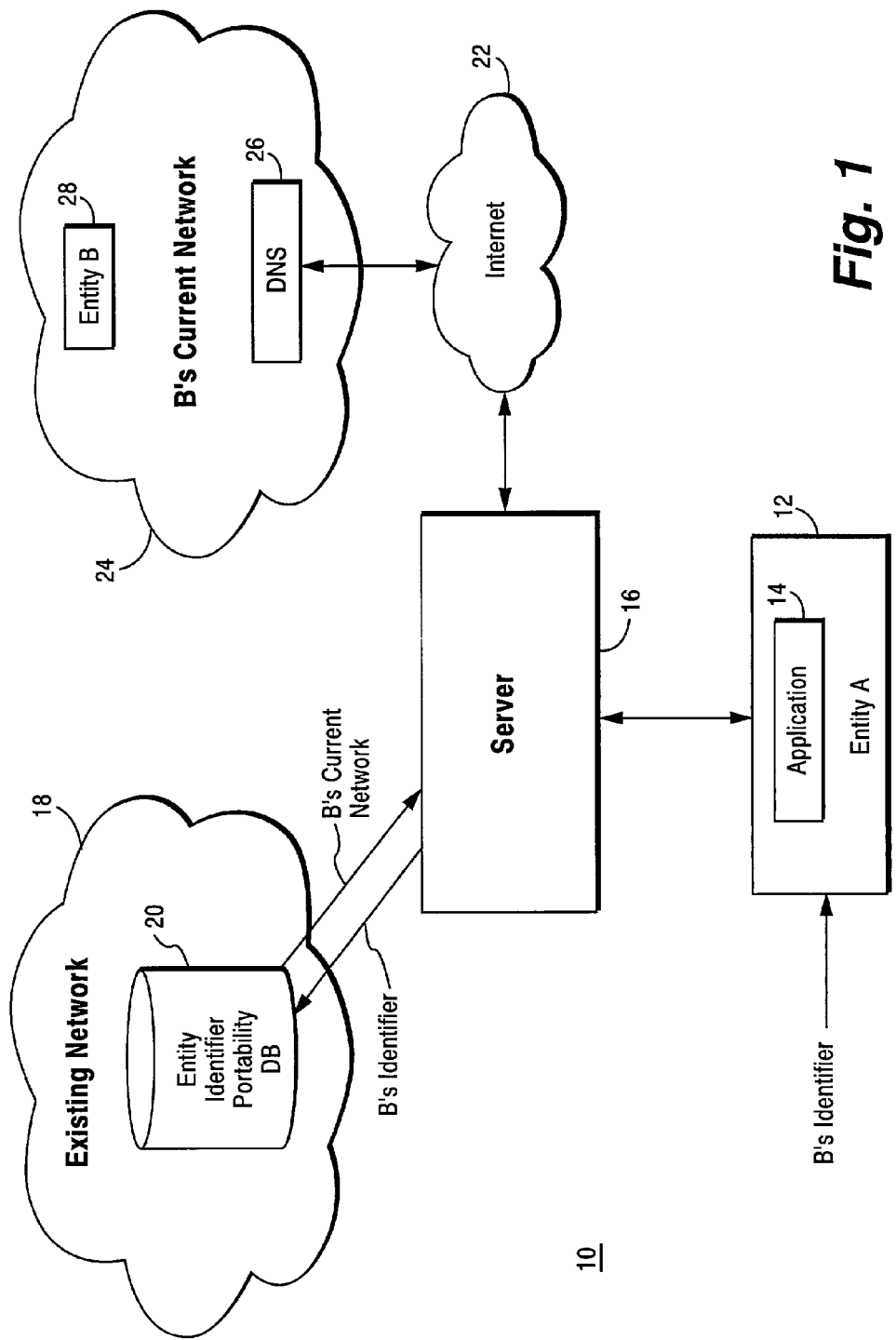
FIG. 1 illustrates a generalized communications system in which the present invention may be implemented.

FIG. 1 illustrates a general communications system 10 illustrating an example application of the invention. An entity "A" 12 receives an entity identifier corresponding to an entity "B" with which "A" desires to establish an Internet session. The term "entity" is used in a most general sense and includes (but is not limited to) any user device, any service application, or any processing unit whether user-specific, network-specific, or both. This entity identifier includes any type of identifier that must be resolved into an Internet protocol (IP) address to permit communication between entity "A" 12 and entity "B" 28 over the Internet 22. B's identifier is included in an Internet address resolution request and forwarded by an application 14 in A's entity 12 to a server 16 which assists in the process of resolving B's identifier into a corresponding IP address.

To facilitate this IP address resolution process, server 16 queries an entity identifier portability database 20 preferably already created and maintained in an existing telecommunications network 18. In the telecommunications world, such existing telecommunications networks 18 are sometimes referred to as SS7-based networks. This entity identifier portability database 20 includes address and identification information corresponding to B. In particular, a database record corresponding to B's identifier contains information regarding the identity or address of B's current network. This information is extracted from B's database record. Server 16 preferably emulates the signaling system/protocol employed by the existing network 18 and portability database 20 to query the database 20. With B's current network identifier information, server 16 sends an IP address resolution request directly to a domain naming system server 26 in B's current network 24 via the Internet 22. The DNS server 26 recognizes B's identifier and provides a corresponding IP address for "B" back to A's user equipment via the Internet 22 and the server 16. Using the IP address, A's entity 12 establishes the desired packet-based session with B.

From the above example of the present invention, one can see a number of advantages. First, the server 16 does not need to store huge amounts of identification information relating to various numbers, names, and addresses associated with a particular entity. The present invention takes advantage of the fact that identifier portability databases are already created and maintained in existing circuit-based networks. The server 16 benefits from that existing information without having to create or maintain it. Using that portability information, the server 16 streamlines the IP address resolution process by sending the IP address resolution query directly to the appropriate DNS server in B's current network. As the database 20 is outside the domain of server 16, the database 20 content is protected because it cannot be accessed simply by browsing on the Internet. These advantages are achieved without major impact on existing IP-based and domain naming systems or on existing telecommunication (e.g., SS7) networks.

Figure 2:
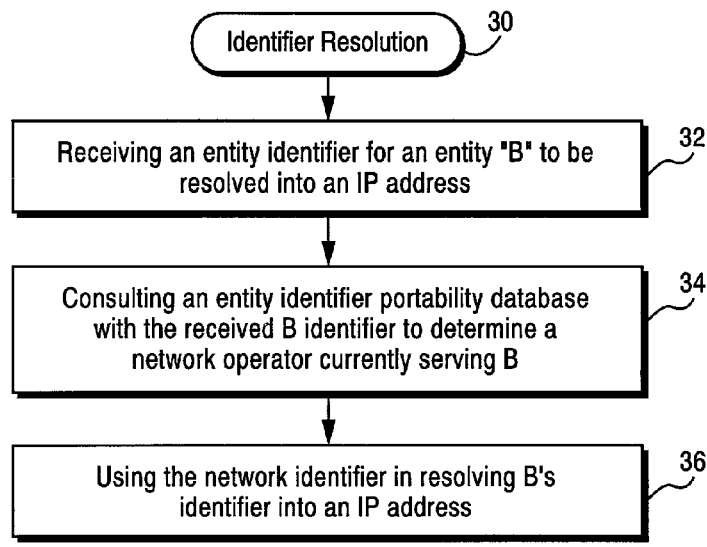
FIG. 2 illustrates an identifier resolution procedure in accordance with one example embodiment of the invention.

FIG. 2 illustrates in flowchart format an identifier resolution routine (block 30) illustrating procedures for implementing an example embodiment of the invention. An entity identifier for an entity "B" is received requesting resolution into a corresponding IP address (block 32). An entity identifier portability database is consulted using the received "B" identifier to determine a network operator currently serving "B" (block 34). A network identifier corresponding to B's network operator is used in the process of resolving B's identifier into a corresponding IP address (block 36).

Figure 3:
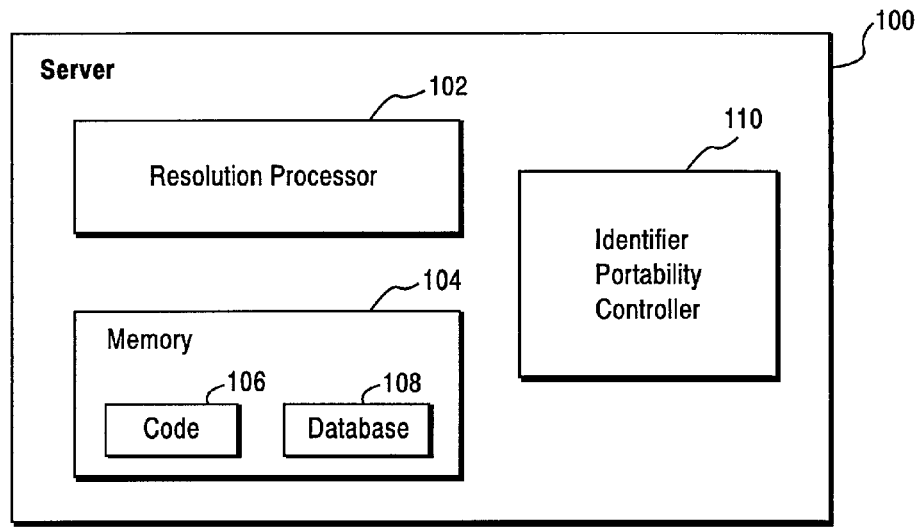
FIG. 3 illustrates a server for implementing an example of the present invention.

FIG. 3 illustrates a server 100 that may be employed to implement the present invention. Server 100 includes a resolution processor 102, a memory 104 including software code 106 and database information 108, and an identifier portability controller 110. Resolution processor 102, in conjunction with software code 106 and information in database 108, responds to a request that an identifier associated with the entity "B" be resolved into an Internet address corresponding to entity "B". Also in response to such an IP address resolution request, the identifier portability controller 110 consults an entity identifier portability database with the identifier and obtains therefrom a network identifier corresponding to a network operator associated with the entity. The identifier portability controller 110 emulates the signaling protocol employed by the identity identifier number portability database when making this consultation. The resolution processor 102 uses the network operator information to facilitate a process of resolving the identifier into the corresponding Internet address.

Figure 4:
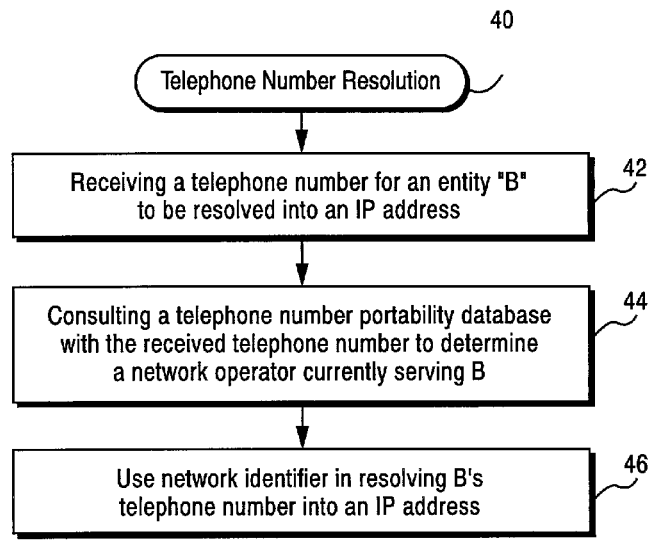
FIG. 4 illustrates a telephone number resolution procedure in accordance with another example embodiment of the invention.

One example of an entity identifier is a telephone number (either a mobile telephone number or a fixed telephone number). Another example is a telecommunications number, like fixed and mobile telephone numbers, as well as other telecommunications numbers like an International Mobile Subscriber Identifier (IMSI) number. Another example of an entity identifier might be a name or an address that is easily understood or recognized by a human. FIG. 4 illustrates in flowchart form a telephone number resolution routine (block 40) as an example of how the present invention may be applied to resolve a telephone number into a corresponding IP address. A telephone number for entity "B" is received by a server to be resolved into a corresponding IP address (block 42). A telephone number portability database is consulted by the server using the received telephone number to determine a network operator currently serving "B" (block 44). Preferably, the server consults with a telephone number portability database created and maintained by an existing telecom network using signaling/protocols already established for that telecom network. The server then uses the network identifier in the process of resolving B's telephone number into a corresponding IP address (block 46).

Figure 5:
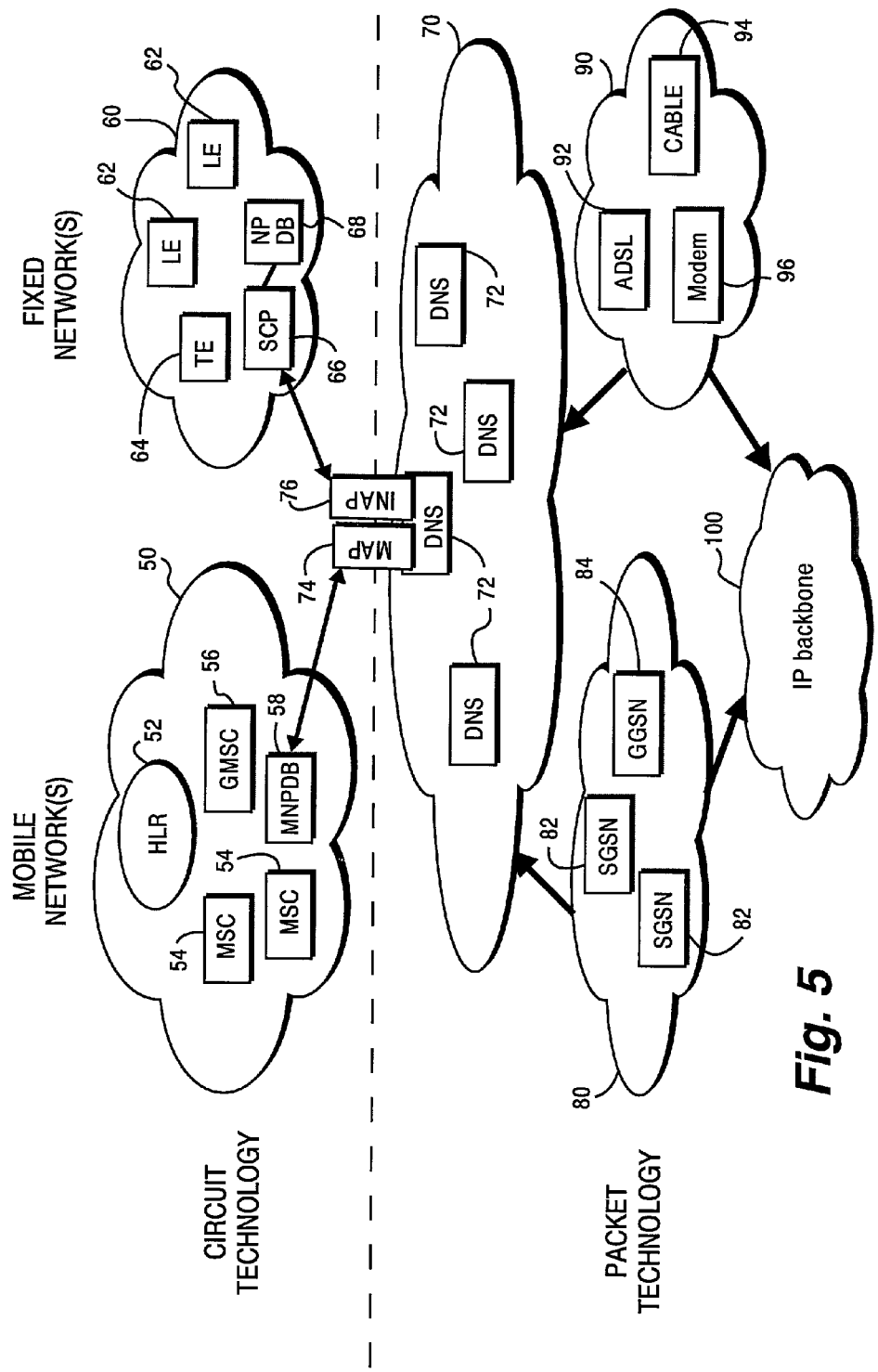
FIG. 5 illustrates an example application of the present invention in a communications system having circuit-switched and packet-switched technologies.

A more specific, but still example application of the present invention is now described in conjunction with the communications system shown in FIG. 5. The system can be divided into two parts: circuit technology and packet technology. The circuit technology portion includes one or more mobile networks 50 and/or one or more fixed networks 60. The mobile network 50 in this example is a GSM network which typically includes a home location register (HLR) database 52 for storing various mobile subscriber subscription and location information. In this example GSM-type mobile network, there are one or more mobile switching centers (MSCs) 54 and a gateway MSC 56. The fixed network 60 may be, for example, an intelligent network including one or more local exchanges (LE) 62 and one or more transit exchanges (TE) 64. A service control point (SCP) 66 provides intelligent network control services triggered at one of the exchanges by a call and may access an intelligent network number portability database (NPDB) 68 in rendering a requested service, e.g., virtual private network, call forwarding, etc.

The packet technology portion includes domain naming system (DNS) network 70 including several DNS servers 72. Coupled to the DNS network 70 is a general packet radio service (GPRS) mobile data network 80 including one or more serving GPRS support nodes (SGSNs) and one or more gateway GPRS support nodes (GGSNs) 84. A wireline packet network offering access to Internet services includes a variety of supported technologies such as an asynchronous digital subscriber link (ADSL) node 92, a cable node 94, and a typical V.90 dial-up modem node 96. The fixed and mobile packet networks 80 and 90 are coupled to an IP backbone 100 otherwise known as the Internet.

In the system shown in FIG. 5, one or more of the DNS servers 72 "bridges" the packet and circuit technology networks to access one or more number portability databases in the circuit technology network(s) using appropriate circuit technology network signaling protocols. The DNS server can access either of these number portability databases created and maintained by their respective mobile or fixed network. The portability database bridge provided by the present invention between circuit technology and packet technology is particularly advantageous in providing multimedia type services including, for example, voice-over-IP, telephony+video, messaging, telephony+on-line gaming, gambling, etc.

In the non-limiting example where traditional mobile and fixed telephone numbers, also referred to herein as E.164 numbers, are used in circuit-based technology networks, there will likely always be a need to address a particular entity using an E.164 telephone number. Although E.164 numbers are used in a global and public environment to address remote entities, other identifier schemes may be used to identify a user subscription location, a user's equipment, and a user's service applications in both public and private environments. However, in addition to these addressing capabilities, there is a desire to also use new, Internet-based addressing applications. Rather than limiting the user to E.164 number-type addressing in circuit technology applications and to IP-type addresses in packet technology applications, the present invention enables the domain naming system network 70 to employ either and to translate between the two addressing methods (SS7 and IP) efficiently.

Specifically, a DNS server 72 makes an inquiry of an existing mobile number portability database 58 or an existing intelligent network number portability database 68 to determine what type of address information is stored corresponding to that E.164 telephone number. Of course, if the database only returns an E.164 telephone number for the remote entity, a circuit technology connection must be employed rather than an IP-type of connection. On the other hand, the number portability database may return a list of associated addresses in addition to an E.164 telephone number corresponding to the remote entity, e.g., a corresponding IP address, a service application server IP address, or a gateway IP address to the packet network, that permits an initiating entity to establish both circuit technology and packet technology sessions with the remote entity. With the freedom to report different types of information, a service provider and/or a network operator may select the set of information which can be shared with remote service providers without jeopardizing the privacy of their customers or making the networks vulnerable to intruders and hackers. Thus, rather than building E.164 telephone number IP address resolution within the domain naming system network 70, the present invention permits reuse of existing investments and infrastructure in circuit technology networks to allow the domain naming system to perform (without substantial modification) the same packet technology address resolution functions it has always performed.

Figure 6:
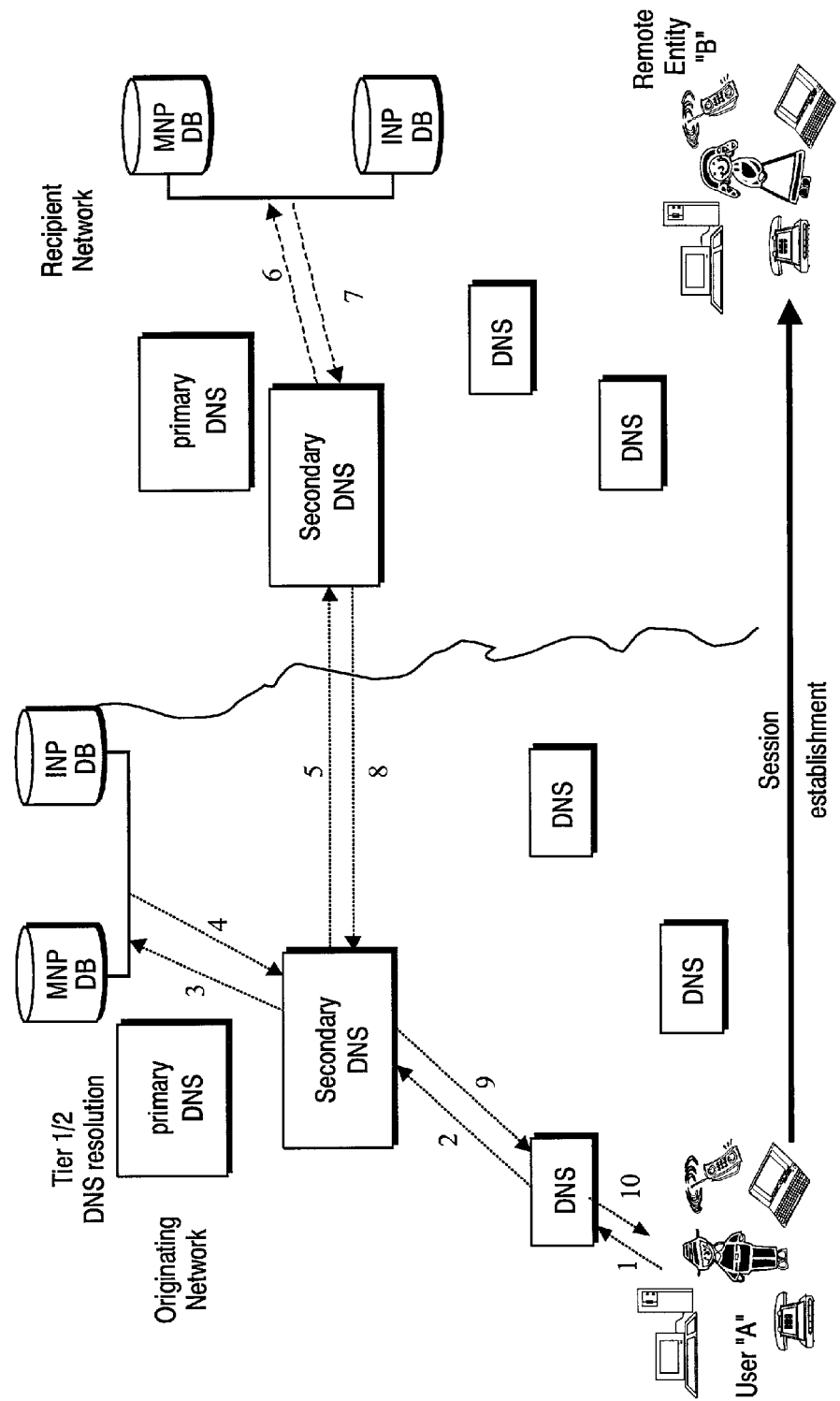
FIG. 6 illustrates an example of how the present invention may be used to establish an Internet session between users "A" and "B" using B's E.164 telephone number.

FIG. 6 shows an example where a user A in an originating network establishes a multimedia type session with a remote entity B in a recipient network using both packet and circuit technologies simply by "A" entering B's E.164 telephone number. "A" employs one or more user equipment units (FIG. 6 shows 4 UE's) that include both circuit technology and packet technology. It is very likely that users will want to use E.164 numbers even in a multimedia packet mode environment. When establishing a multimedia session with remote entity B using B's known E.164 identity, user A enters B's E.164 telephone number into A's packet-based user equipment, e.g., a lap-top or desktop PC. A software application running on A's user equipment converts the E.164 telephone number into an IP address resolution query, i.e., an ENUM query. Such ENUM queries are explained in the Internet Engineering Taskforce Request for Comments (RFC) 2916 which describes a method of sending E.164 numbers in the DNS infrastructure. The ENUM can be viewed as a format for a DNS query carrying number information, like E.164 telephony numbers. The relation between ENUM and E.164 is depicted in the assigned tier 0/1 top level domain "e164. arpa" that resolves ENUM queries.

Pursuant to the specification in RFC 2916, the original E.164 telephone number is converted into an ENUM message format. For example, if the original E.164 telephone number is +46-8-976-1234, the ENUM query is 4.3.2.1.6.7.9.8.6.4. e164. arpa. Essentially, the digit order of telephone number is reversed, and the highest level domain e164. arpa is appended at the end. The ENUM query is then provided to a local DNS server (reference numeral 1).

In FIG. 6, DNS levels or tiers 1, 2, 3 and subsequent levels/tiers refer to different portions of the E.164 number and the configuration of DNS system. A dot in a DNS query typically represents a possible "tier," referred as a DNS "zone cut," expressing a transition between two tiers or DNS zones. However, a specific DNS hierarchy might handle two or more dots within one DNS zone. For example, tier 0 may correspond to the root DNS server and the top level domain "e164. arpa." Tier 1 corresponds to a country code and is resolved by a secondary DNS server associated with that tier 1. Tier 2 may include, for example, an area code and/or local exchange code within a particular country and is resolved by a secondary DNS server associated with that tier 2. Tier 3 corresponds to a subscriber number, typically four digits following the local exchange, and is resolved by a secondary or a local DNS server in that tier 3 layer. A primary server in most DNS configurations acts as a back-up server to the underlying secondary DNSs as well as manages and updates all secondary servers during operation. In the example provided here, the originating and recipient networks are in the same country, i.e., both in the same tier 1. However, the present invention can be employed at any tier level of the DNS system.

According to RFC 2916, the domain naming system uses the ENUM query to retrieve a naming authority pointer (NAPTR) record associated with the E.164 number of entity B. The DNS response to the ENUM query contains one or more NAPTR records corresponding to the E.164 number, and each NAPTR record contains one or more uniform resource identifiers (URIs) corresponding to the entity. From a URI, a service and/or address corresponding to the entity B, e.g., an IP address, may be derived. Thus, for the example ENUM name query given above, the DNS response might be:

$ORIGIN4.3.2.1.6.7.9.8.6.4. e164. arpa.
IN NAPTR 100 10 "u" "sip+E2U" "!^.*$!sip:info@tele2. se!"
IN NAPTR 102 10 "u" "mailto+E2U" "!^.*$!mailto: info@tele2.se!".

This NAPTR record indicates that the subscriber prefers to be contacted first via session-over-IP (SIP) and second via simple mail transfer protocol (SMTP), similar to other protocols over IP such as file transfer protocol (FTP). The origin application serving user A may select any of the received URIs and convert the URI into a physical IP-address by requesting the address record translation from the DNS system, referred to as an "A-record query." An illustrative example of an A-record query or request is the translation of the received SMTP URI $!mailto: info@tele2.se!" into a physical IP version 4 address, e.g., "192.222.345.234". More information regarding NAPTR/DNS resource records may be found at RFC 2915, for URIs, at RFC 2936, and for A-record queries at RFCs 1034 and 1035.

Because the initial receiving DNS server, sometimes referred to as the "forwarding DNS," does not recognize the E.164 number for entity B in its subdomain level, it forwards the ENUM query to the next, secondary level or tier DNS server (reference numeral 2). The secondary DNS server consults one or more telephone number portability databases, such as a mobile number portability database (NMPDB) and an intelligent network number portability database (INPDB), using the E.164 telephone number extracted from the ENUM query (reference numeral 3). The queried number portability database in the circuit-switched network retrieves a portability or a subscription related information record corresponding to that E.164 number and returns that information to the secondary DNS server (reference numeral 4). The communications indicated at reference numerals 3 and 4 are preferably performed using the signaling protocol of the accessed number portability database. In this example, such a signaling protocol corresponds to signaling system 7 (SS-7) with the mobile application protocol (MAP) for the mobile number portability database or signaling system 7 (SS-7) with the intelligent network application protocol (INAP) for the intelligent network number portability database.

The portability record returned from the number portability database includes a network prefix (NPR) or other network identifier that identifies that the E.164 telephone number belongs to the network operator in the recipient network. Accordingly, the secondary DNS server uses its own resolution process to locate the remote secondary DNS server corresponding to this network prefix to send the ENUM query specifically to a secondary level DNS server in the recipient network (reference numeral 5). Reference numerals 6 and 7 illustrate optional number portability or other type of location database lookup, which might be necessary to perform in certain applications to locate user B's subscription server, e.g., an HLR lookup in a mobile network application. The recipient network secondary DNS server recognizes the E.164 number as belonging to remote entity B in its network and therefore can report the relevant NAPTR resource record corresponding to or serving that E.164 telephone number. The NAPTR URI content may then be translated within the DNS secondary server into an IP address using the DNS "A-record request" functionality. The IP address is returned to the secondary DNS server in the originating network (reference numeral 8). That corresponding IP address is forwarded from the secondary DNS server to the local DNS server (reference numeral 9), and from the local DNS to the application user A's equipment (reference numeral 10). With that IP address, A's user equipment can then establish a multimedia session with remote entity B using both B's E.164 telephone number and B's IP address.

Figure 7:
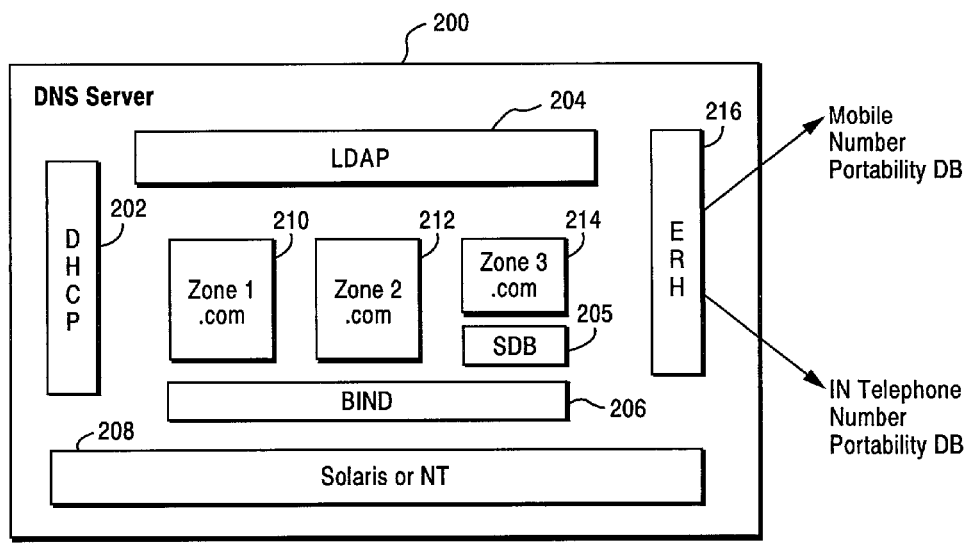
FIG. 7 illustrates another server that can be used to implement an example of the present invention in the communications system in FIG. 4.

FIG. 7 illustrates a local DNS server 200 that may be employed in an example, but non-limiting application in the context of the system shown in FIG. 5. The DNS server 200 includes a dynamic host configuration protocol (DHCP)

controller 202 to permit server 200 to communicate with and broadcast messages to other DNS servers and to exchange IP addresses between the DNS servers thereby allowing addition of new DNS servers on the fly. A lightweight data application protocol (LDAP) controller 204 may be used to enter and retrieve information from an operator management database or to define entries in the DNS server memory. A simplified database (SDB) 205 enables the DNS server to use the assistance of external resources in the resolution process of a DNS query. A Berkeley Internet Naming Software (BIND) controller 206 executes the DNS code that allows the DNS server 200 to resolve names into IP addresses and runs on a UNIX (SOLARIS) or WINDOWS (NT) operating system/platform 208. The BIND controller 206 may serve a single zone or a multiple zones within the same DNS server, e.g., Zone 1=".com" (210), Zone 2=".int" (212), and Zone 3=".e164.arpa" (214).

An extension resolution handler (ERH) 216 used in this example embodiment employs the SDB 205 to assist the DNS in the resolution process of E.164 numbers and to query one or more telephone number portability databases maintained in circuit technology-based networks. For example, the ERH 216 can help resolve an E.164 query by consulting the mobile number portability database 58 in the mobile network 50 or an intelligent network telephone number portability database 68 in the fixed network 60 to obtain address information, and in particular, network operator address information corresponding to the E.164 telephone number. This network address information is used by the involved service application in the server 200 in the process of resolving the E.164 number into an IP address.

Consider the example session in FIG. 6. When the DNS server 200 receives a ENUM query in the form of "extn.lex.npr.cc.e164.arpa," (where "etxn" stands for the telephone number extension, "lex" corresponds to the local telephone exchange, "npr" corresponds to the network operator prefix, and "cc" corresponds to country code), the secondary DNS server of the identified country in the DNS server 200 checks whether the received number is international or national by viewing the country code. If an international country code is detected, the DNS server 200 acts in accordance with the established DNS resolution process (1) for recursive resolution to the higher identified tier or (2) for retrieval from the DNS internally stored information of the address of the remote international DNS server corresponding to the international country code. A new DNS/ENUM query is then sent by the forwarding DNS server toward the IP address of the secondary DNS server of the identified country.

If a national number is detected, the DNS/ENUM resolution process in the secondary DNS server 200 is temporarily halted, and the ERH 216 queries a number portability database from an existing network. For example, the ERH 216 extracts the E.164 telephone number from the original ENUM query and constructs either an MAP SRI message to query the mobile number portability database 58 or an INAP IDP message to query the intelligent network number portability database 68. The ERH may construct an emulated Signaling System 7 (SS7) database query using the E.164 telephone number as an SCCP GT called party number parameter. The number portability database responds to the query with a NAPTR record including a specific network routing prefix (NPR) pointing to another network in the same country that corresponds to the E.164 number. The ERH 216 may directly locate the remote secondary DNS server corresponding to the received NPR, or it may simply initiate a recursive query in the DNS indicating the logical address of the remote network, e.g., the received NPR, which will be identified by the normal DNS resolution process for continuous processing. The ERH 216 or the DNS 200 may include the network prefix NPR in the ENUM message sent to the secondary DNS server in the recipient network.

Figure 8:
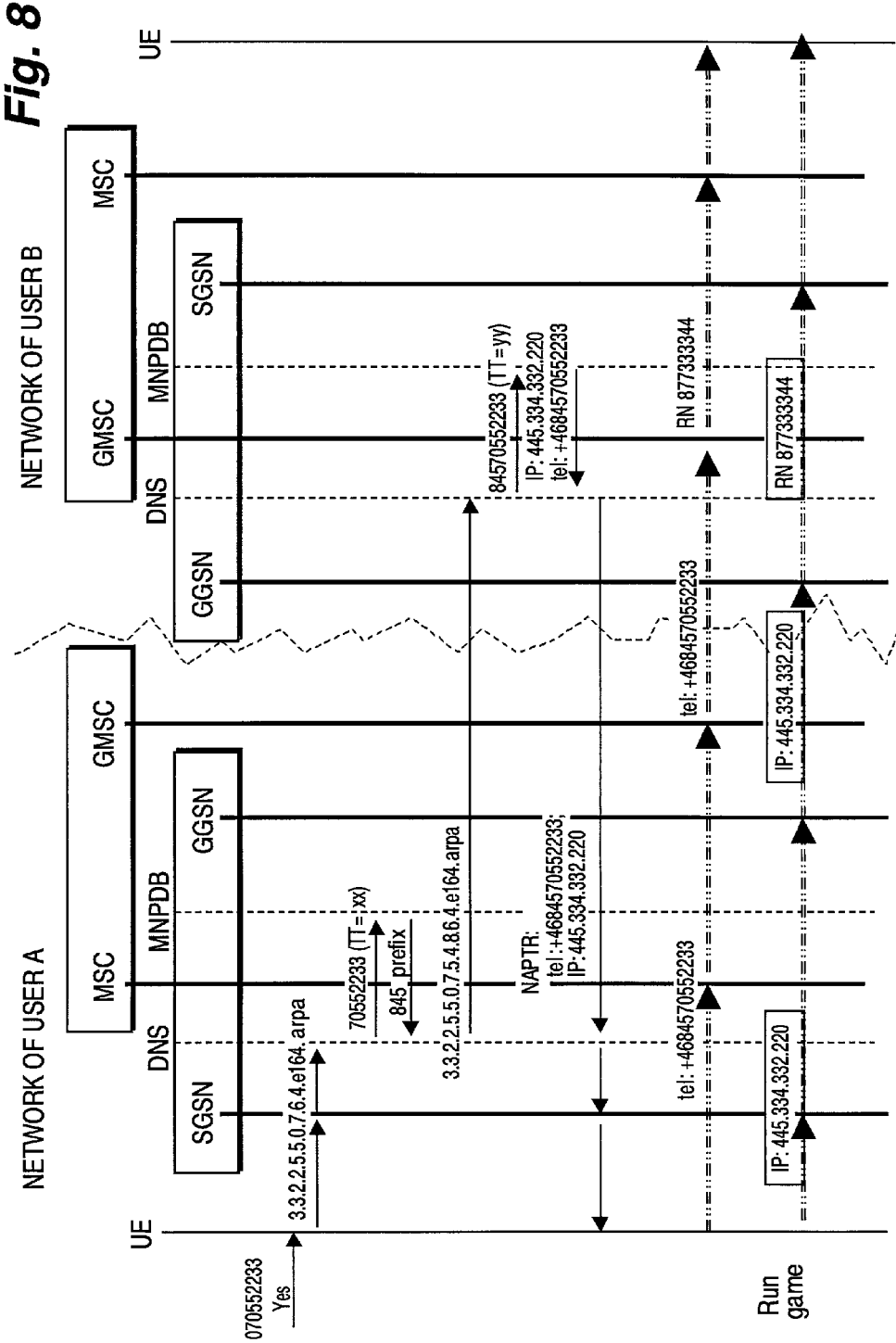
FIG. 8 is a signaling diagram for an online game and telephony service application in which the present invention is employed.

As indicated above, the present invention may be used to establish a multimedia or other communications session that includes one or more of the following example applications: voice-over-IP, web surfing, e-mail, videoconferencing, video-on-demand, audio-on-demand, intranetwork access, gaming, and gambling, either with or without a circuit-switched voice communication. An example of the present invention applied to a an on-line game coupled with a telephony service application is now described in the signaling diagram of FIG. 8.

User A enters an E.164 telephone number 070552233 corresponding to "B" into A's user equipment (UE). A's user equipment generates an ENUM query using the E.164 telephone number as follows: 3.3.2.2.5.5.0.7.6.4. e164. arpa. The ENUM query is sent through the mobile packet network, i.e., the GPRS network 80 shown in FIG. 4, to an SGSN node which forwards the ENUM message to a domain name server, i.e., DNS server 72 in FIG. 4. The extension resolution handler 216 in the DNS server 200 extracts the E.164 telephone number from the ENUM query and constructs and emulated SS-7 database query with that telephone number to the mobile network number portability database (NMPDB) 58. Based on that telephone number, the mobile number portability database 58 returns to the extension resolution handler 216 a network prefix 845 corresponding to the network of user B using that network prefix, the extension resolution handler 216 adds the network prefix 845 to the ENUM query and forwards it directly to a secondary DNS server in the recipient mobile network of user B corresponding to the network prefix 845. That DNS server then accesses its own mobile number portability database which includes a record for user B, e.g., an NAPTR record, and forwards a corresponding IP address 445.334.332.220 along with user B's telephone number 4684570552233 back to A's user equipment via the secondary DNS server in B's network, the DNS server and SGSN in A's network. The IP session needed to play the game between "A" and "B" can now established.

At this point, user A establishes a voice communication via traditional MSC and GMSC nodes in the mobile networks of users A and B using B's mobile telephone number 4684570552233. At the same time "A" and "B" are talking on their respective phones, A's user equipment can run a game by establishing an IP data link with B's user equipment using the IP address 445.334.332.220 via the GPRS nodes SGSN and GGSN in "A" and B's GPRS networks.

Figure 9:
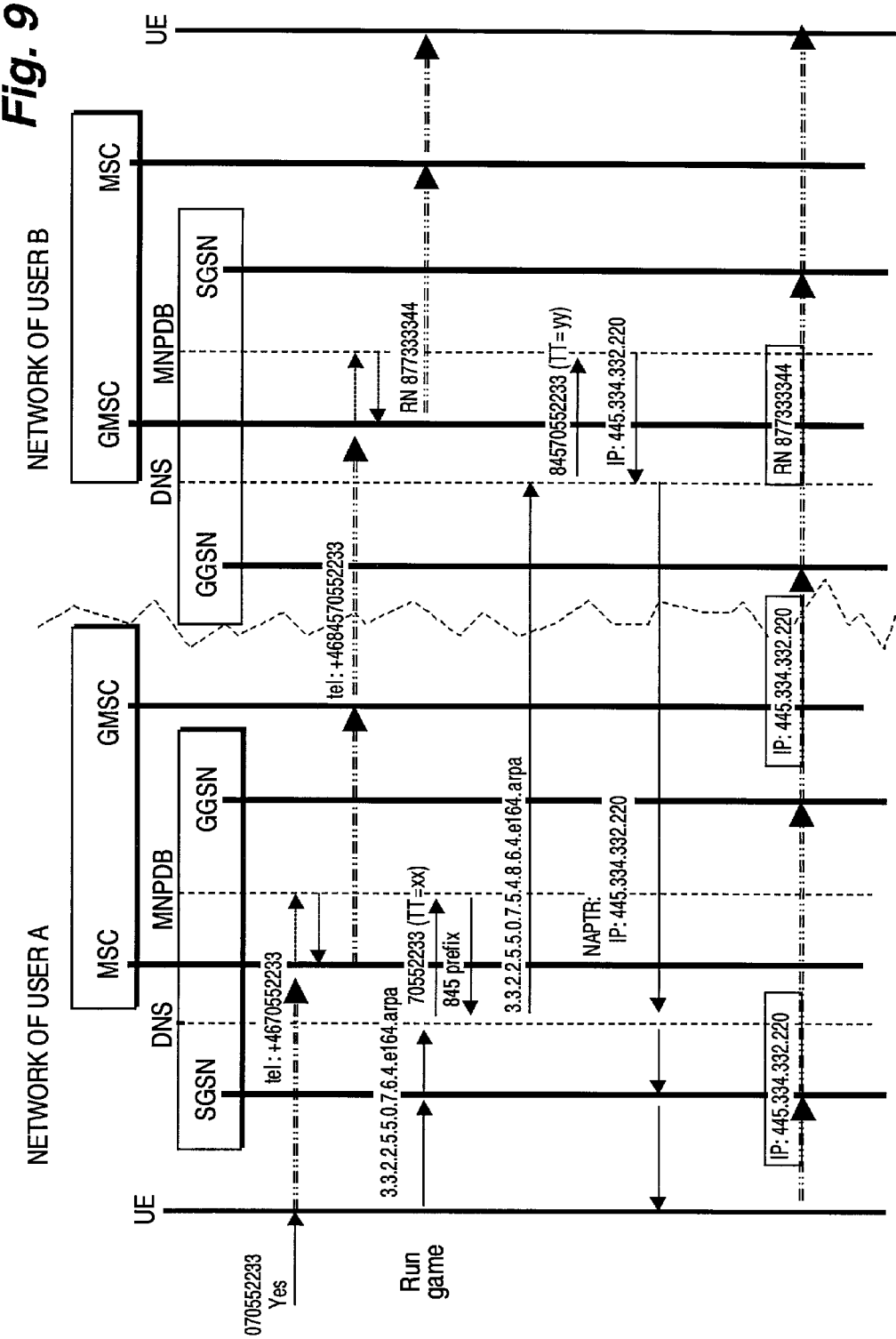
FIG. 9 is a signaling diagram for another variation of an online game and telephony service application in which the present invention is employed.

FIG. 9 illustrates a signaling diagram for another example way of implementing the same game and telephony service application between user A and user B. In this example, "A" first establishes a voice connection with "B" before setting up the game. User A enters B's mobile telephone number 070552233 in A's mobile phone which forwards the number to the MSC in A's network. The MSC determines the current network where "B" is located using the mobile number portability database and forwards the telephone number 4684570552233 to the GMSC and MSC in B's network to establish the voice call.

After establishing a voice call, "A" enters B's telephone number 070552233 into A's packet-based user equipment which formulates an ENUM request 3.3.2.2.5.5.7.6.4. e164. arpa. The ENUM message is forwarded by the SGSN to the DNS server in A's network. The DNS server consults the mobile number portability database 58 in the circuit-switched mobile network 50 using the E.164 telephone number 4670552233. The database 58 provides the network prefix of B's network, 845, and the DNS server reformulates the ENUM query to include that prefix. The modified ENUM query is sent directly to the appropriate DNS server in B's network, which extracts the E.164 telephone number corresponding now to 84570552233. This E.164 telephone number is used to consult the mobile network portability database in B's network to determine B's IP address 445.334.332.220. That corresponding IP address is returned from the database to A's user equipment through the DNS servers in the SGSN in A's network. Thereafter, A's user equipment uses the IP address corresponding to B's user equipment to establish a data session to run the electronic game.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. For example, a multimedia messaging service center (MMSC) in network A may send a multimedia message using an E.164 number to reach the multimedia messaging center of user B in a remote network. An MMSC server is likely IP-based, and uses the DNS and IP backbone for communication. Therefore, DNS/ENUM can be used to resolve the E.164 number using a number portability check via a DNS/ENUM query. Once a multimedia message is sent to a terminating MMSC, the latter will deliver the message to the user using internal routines and procedures. In this example, the DNS/ENUM process is relevant for server-to-server communication without any on-line user. Thus, although the present invention is described in relation to a preferred example embodiments, it is to be understood that this disclosure is only illustrative and exemplary of the present invention. The scope of the invention is defined by the appended claims.

What is claimed:

1. A method for determining an Internet address for an entity, comprising:
   providing an identifier corresponding to the entity;
   requesting that the identifier be resolved into an Internet address corresponding to the entity;
   consulting an entity identifier portability database using the identifier to determine a network operator associated with the entity;
   providing from the entity identifier portability database a network identifier corresponding to the network operator associated with the entity; and
   using the network identifier in a process of resolving the identifier into the corresponding Internet address.

2. The method in claim 1, further comprising:
   establishing a communication session with the entity using the corresponding Internet address.

3. The method in claim 2, wherein the communication session includes one or more of the following applications: voice over IP, web surfing, e-mail, video conferencing, video on demand, audio on demand, intra-network access, and electronic gaming either with or without a circuit-switched voice communication.

4. The method in claim 1, wherein the identifier is entered by a calling user, the method further comprising:
   the calling user generating a telephone query for the identifier and providing the telephone query to a domain name system (DNS) server.

5. The method in claim 4, wherein the identifier is a telephone number and the entity identifier database is a telephone number portability database.

6. The method in claim 5, wherein the telephone number portability database is a mobile network number portability database.

7. The method in claim 5, wherein the telephone number portability database is a fixed network number portability database.

8. The method in claim 5, wherein the telephone number portability database is an intelligent network number portability database.

9. The method in claim 1, wherein the entity identifier portability database is consulted using a message that conforms with a protocol consistent with that entity identifier portability database.

10. The method in claim 1, wherein network identifier is a network prefix.

11. The method in claim 10, wherein a first server uses the network prefix to send a entity identifier resolution request to a second server associated with the entity's network operator, the second server resolving the identifier into the corresponding Internet address associated with the entity and returning the corresponding Internet address to a calling entity via the first server.

12. The method in claim 11, wherein the identifier is a telephone number and the entity identifier database is a telephone number portability database, and wherein the calling entity generates a first telephone number query for the telephone number and provides the first telephone number query to the first server, the method further comprising:
   after receiving the network prefix, the first server including the network prefix in the first telephone number query to generate a second telephone number query.

13. The method in claim 12, further comprising:
   the first server sending the second telephone number query to the second server, and
   the second server returning a naming authority pointer (NAPTR) record with a uniform resource identifier (URI) corresponding to the called entity.

14. The method in claim 13, further comprising:
   the first server sending the second telephone number query to the second server, and
   the second server returning a NAPTR record with plural uniform resource identifiers (URIs) corresponding to the called entity.

15. A method for resolving a telephone number corresponding to an entity to be contacted into an Internet address using a domain name system (DNS) server and a telephone number portability database,
   wherein the DNS server accesses the telephone number portability database to determine a network operator serving the entity and sends a DNS resolution ciuerv for the telephone number to a DNS server associated with the serving network operator.

16. The method in claim 15, wherein the telephone number portability database is a mobile network number portability database.

17. The method in claim 15, wherein the telephone number portability database is a fixed network number portability database.

18. The method in claim 15, wherein the telephone number portability database is an intelligent network number portability database.

19. A method for determining an Internet address corresponding to a entity with which a communication session is to be established, comprising:
 entering at a mobile node a telephone number of the entity;
 the mobile node converting the telephone number into a telephone number (ENUM) query;
 the mobile node sending the ENUM query over a radio interface to be provided to a first server requesting resolution of the telephone number to a corresponding Internet address;
 the first server analyzing the message, accessing a telephone number portability database, and retrieving therefrom a network identifier for a network associated with the entity;
 the first server then sending the message to a second server associated with the identified network requesting resolution of the telephone number to return corresponding Internet address information; and
 the second server providing the corresponding Internet information to the first server.

20. The method in claim 19, wherein the mobile node is attached to a GPRS network and sends an ENUM message to an SGSN, the method further comprising:
 the SGSN forwarding the ENUM message to the first DNS;
 the first DNS extracting from the ENUM message the telephone number and sending the telephone number to the telephone number portability database, and
 the telephone number portability database returning to the first DNS a network prefix identifying the network associated with the entity.

21. The method in claim 20, further comprising:
 the first DNS including the network prefix in the ENUM message and sending the ENUM message to the second DNS server.

22. The method in claim 21, further comprising:
 the second DNS server determining the corresponding Internet address information for the entity and returning the Internet address information to the first DNS in the form of a naming authority pointer (NAPTR) record.

23. The method in claim 22, further comprising:
 the first DNS sending the NAPTR record to the SGSN, and
 the SGSN sending the NAPTR record to the mobile node.

24. The method in claim 23, further comprising:
 the mobile node using the NAPTR record to establish an Internet session with the entity.

25. The method in claim 19, wherein the entity is another mobile node and the number portability database is a mobile number portability database.

26. The method in claim 25, further comprising:
 the first server constructing an emulated signaling system number 7 (SS7) database query with the telephone number using a mobile application part (MAP) protocol message.

27. The method in claim 19, wherein the entity is a fixed station and the telephone number portability database is an intelligent network database.

28. The method in claim 27, further comprising:
 the first server constructing an emulated signaling system number 7 (SS7) database query with the telephone number using a intelligent network application part (INAP) protocol message.

29. A server for assisting in determining an Internet address for an entity in response to a request that an identifier associated with the entity be resolved into an Internet address corresponding to the entity, comprising:
 a resolution processor for handling the request;
 a memory, coupled to the resolution processor, for storing information related to resolving an identifier into an Internet address; and
 an identifier portability controller for consulting an entity identifier portability database with the identifier and obtaining from the entity identifier portability database a network identifier corresponding to a network operator associated with the entity,
 wherein the resolution processor is configured to use the network identifier in a process of resolving the identifier into the corresponding Internet address.

30. The server in claim 29, wherein the resolution extension handler is configured to use a protocol associated with the entity identifier number portability database when consulting the entity identifier portability database.

31. The server in claim 30, wherein the entity identifier portability database is a mobile network number portability database.

32. The server in claim 30, wherein the entity identifier portability database is a fixed network number portability database.

33. The server in claim 30, wherein the entity identifier portability database is an intelligent network number portability database.

34. The server in claim 29, wherein the entity identifier portability database is a telephone number portability database, and wherein the request is a first telephone number (ENUM) query corresponding to the telephone number.

35. The server in claim 29, wherein the resolution processor is configured to include the network identifier in the first ENUM query to generate a second ENUM query.

36. The server in claim 35, wherein the resolution processor is configured to send the second ENUM query to a second server and receive from the second server a naming authority pointer (NAPTR) record with a uniform resource identifier (URI) corresponding to the entity.

37. The server in claim 29, wherein network identifier is a network prefix and the resolution processor is configured to use the network prefix to send a entity identifier resolution request to another server associated with the entity's network operator to permit resolution of the identifier into the corresponding Internet address associated with the entity, the resolution processor being further configured to receive from the other server information related to the corresponding Internet address information and return the corresponding Internet address information to a requesting node.

38. The server in claim 29, wherein the memory includes a database of domain names and corresponding Internet addresses and Internet naming software, further comprising:
 a dynamic host configuration processor coupled to the resolution processor.

39. A computer-readable product comprising:
 a computer usable medium having computer readable code embodied therein including:
 code to receive an identifier associated with an entity to be contacted over the Internet and a request that the identifier be resolved into an Internet address corresponding to the entity;
 code to consult an entity identifier portability database with the identifier;
 code to obtain from the entity identifier portability database a network identifier corresponding to network operator associated with the entity; and code to provide the network identifier for use in resolving the identifier into the corresponding Internet address.

40. The computer-readable product in claim 39, wherein the computer readable code further includes code to communicate with other code in a domain naming system (DNS) server.

41. The computer-readable product in claim 39, wherein the computer readable code includes code to communicate with the entity identifier portability database using a protocol associated with the entity identifier portability database.

42. The computer-readable product in claim 41, wherein the entity identifier portability database is a mobile telephone number portability database, and wherein the computer readable code includes code to communicate with the mobile telephone number portability database using a mobile applications protocol (MAP).

43. The computer-readable product in claim 41, wherein the entity identifier portability database is an intelligent network telephone number portability database, and wherein the computer readable code includes code to communicate with the intelligent network telephone number portability database using an intelligent network applications protocol (INAP).

44. A system for resolving a telephone number corresponding to a called entity into an Internet address, comprising:
    user equipment for generating a message including the telephone number;
    a first domain naming system (DNS) server for receiving the message and for generating a database query using the telephone number; and
    a telephone number portability database for receiving the database query and for providing to the DNS server information regarding the telephone number,
    wherein the first DNS server is configured to use the information to facilitate resolution of the telephone number into a corresponding Internet address.

45. The system in claim 44, wherein the first DNS server is configured to query the telephone number portability database to determine a network operator serving the called entity.

46. The system in claim 44, wherein the first DNS server includes a resolution handler for querying the telephone number portability database to determine a network operator serving the called entity.

47. The system in claim 44, wherein the telephone number portability database is a fixed network number portability database.

48. The system in claim 44, wherein the telephone number portability database is an intelligent network number portability database.

49. The system in claim 44, wherein the telephone number portability database is a mobile network number portability database.

50. The system in claim 49, wherein the first DNS server is configured to send the message to a second DNS server associated with the identified network requesting resolution of the telephone number to return a corresponding Internet address; and
    wherein the second DNS server is configured to provide the corresponding Internet address to the first DNS server.

51. The system in claim 50, wherein the user equipment is a mobile node attached to a GPRS network and is configured to send a telephone number (ENUM) message to an SGSN, the SGSN being configured to forward the ENUM message to the first DNS server which is configured to extract from the ENUM message the telephone number and to query the mobile network number portability database with the telephone number.

52. The system in claim 51, wherein the first DNS is configured to include the network prefix in the ENUM message and to send the ENUM message to the second DNS server.

53. The system in claim 52, wherein the second DNS server is configured to determine the corresponding Internet address for the entity and to return the Internet address to the first DNS in the form of a naming authority pointer (NAPTR) record.

54. The system in claim 53, wherein the first DNS is configured to send the NAPTR record to the SGSN, and the SGSN is configured to send the NAPTR record to the user equipment.

55. The system in claim 54, wherein the user equipment is configured to use the NAPTR record to establish an Internet session with the entity.

56. The system in claim 51, wherein the first DNS server is configured to construct an emulated signaling system number 7 (SS7) database query with the telephone number using a mobile application part (MAP) protocol message.

57. The system in claim 44, wherein the entity is a fixed station and the telephone number portability database is an intelligent network database.

58. The system in claim 44, wherein the first DNS server is configured to construct an emulated signaling system number 7 (SS7) database query with the telephone number using a intelligent network application part (INAP) protocol message.

59. A processor comprising processing circuitry and memory configured to assist in a process of resolving a telephone number corresponding to an entity to be contacted into an Internet address using resources in a domain name system (DNS) and resources in a telephone number portability database,
    wherein the processing circuitry is configured to access the telephone number portability database to determine a network operator serving the entity and to send a DNS resolution query for the telephone number to a DNS server associated with the serving network operator.

60. The processor in claim 59, wherein the telephone number portability database is a mobile network number portability database.

61. The processor in claim 59, wherein the telephone number portability database is a fixed network number portability database.

62. The processor in claim 59, wherein the telephone number portability database is an intelligent network number portability database.

63. A method for determining a type of DNS query for an entity resolution process, comprising:
    receiving an identifier corresponding to an entity in a first DNS query;
    consulting a entity identifier portability database using the identifier to determine a network operator associated with the entity;
    providing from the entity identifier portability database a network identifier corresponding to the network operator associated with the entity; and
    using the network identifier in a process of generating a second DNS query for resolving the identifier into a corresponding Internet address.

64. The method in claim 63, wherein the first and the second DNS queries use ENUM messages belonging to a same tier domain.

65. The method in claim 64, wherein distinguishing between the first and the second DNS queries triggers the number portability consultation using a NAPTR resolution process.

66. The method in claim 65, wherein the distinguishing relates to detection of the network identifier and an entity identifier imbedded within the ENUM message.

67. The method in claim 63, wherein the first and the second DNS queries use the ENUM messages belonging to two separate tier domains.

68. The method in claim 67, wherein the first DNS query recognized by the first tier triggers the number portability consultation and the second DNS query recognized by the second tier triggers a NAPTR resolution process.

* * * * *